United States Patent
Kang et al.

(10) Patent No.: US 8,134,944 B2
(45) Date of Patent: Mar. 13, 2012

(54) APPARATUS AND METHOD FOR CONFIGURING A RELAY FRAME CONTROL HEADER IN A MULTI-HOP RELAY BROADBAND WIRELESS ACCESS COMMUNICATION SYSTEM

(75) Inventors: Hyun-Jeong Kang, Seoul (KR); Chang-Yoon Oh, Yongin-si (KR); Young-Bin Chang, Anyang-si (KR); Jae-Weon Cho, Suwon-si (KR); Hyoung-Kyu Lim, Seoul (KR); Sung-Jin Lee, Seoul (KR); Mi-Hyun Lee, Seoul (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 1077 days.

(21) Appl. No.: 11/877,643

(22) Filed: Oct. 23, 2007

(65) Prior Publication Data

US 2008/0101275 A1 May 1, 2008

(30) Foreign Application Priority Data

Oct. 27, 2006 (KR) .................. 10-2006-0105328

(51) Int. Cl.
*H04B 7/14* (2006.01)
(52) U.S. Cl. ......... 370/315; 370/252; 370/328; 370/338
(58) Field of Classification Search .................. 370/315, 370/252, 338, 329; 455/7
See application file for complete search history.

(56) References Cited

U.S. PATENT DOCUMENTS

| | | | |
|---|---|---|---|
| 7,209,746 B1* | 4/2007 | Kirino et al. | 455/450 |
| 2004/0102219 A1* | 5/2004 | Bunton et al. | 455/560 |
| 2005/0159163 A1* | 7/2005 | Chang et al. | 455/450 |
| 2006/0046643 A1* | 3/2006 | Izumikawa et al. | 455/7 |
| 2006/0133455 A1* | 6/2006 | Agrawal et al. | 375/146 |
| 2006/0153132 A1* | 7/2006 | Saito | 370/329 |
| 2006/0227778 A1* | 10/2006 | Jin et al. | 370/389 |
| 2006/0270341 A1* | 11/2006 | Kim et al. | 455/16 |
| 2007/0058577 A1* | 3/2007 | Rubin | 370/328 |

(Continued)

FOREIGN PATENT DOCUMENTS

JP 2004-297152 A 10/2004

(Continued)

OTHER PUBLICATIONS

Part 16: Air Interface for Fixed Broadband Wireless Access Systems, IEEE std. 802.16 Part 16, Oct. 1, 2004, IEEE Computer Society and the IEEE Microwave Theory and Techniques Society.
Part 16: Air Interface for Fixed Broadband Wireless Access Systems, IEEE Standard 802.16, IEEE Standard for Local and Metropolitan Area Networks, Oct. 1, 2004, pp. 501-502.

*Primary Examiner* — Ricky Ngo
*Assistant Examiner* — Rasheed Gidado
(74) *Attorney, Agent, or Firm* — Jefferson IP Law, LLP (57) ABSTRACT

An apparatus and method for configuring a Relay-Frame Control Header (R-FCH) transmitted in an intermediary link area in a multi-hop relay Broadband Wireless Access (BWA) communication system are provided. The method includes determining a modulation scheme of a Relay Station (RS) Downlink (DL)-MAP (or simply referred to as R-MAP) in consideration of a channel state with the RS while an initial network entry process is performed by the RS or while communicating with the RS in a Base Station (BS)-RS area where communication is made with RSs connected to the BS and transmitting a message including the determined modulation scheme to the RS. Accordingly, a Modulation and Coding Scheme (MCS) on the R-MAP can be dynamically changed according to a channel state between an RS and a BS, thereby enabling effective use of resources.

16 Claims, 8 Drawing Sheets

U.S. PATENT DOCUMENTS

| | | | |
|---|---|---|---|
| 2007/0160014 A1* | 7/2007 | Larsson | 370/338 |
| 2007/0160213 A1* | 7/2007 | Un et al. | 380/270 |
| 2007/0280172 A1* | 12/2007 | Tan et al. | 370/335 |
| 2008/0070582 A1* | 3/2008 | Cai | 455/450 |

FOREIGN PATENT DOCUMENTS

| | | |
|---|---|---|
| KR | 10-2004-0028114 A | 4/2004 |
| WO | 2006/001308 A1 | 1/2006 |
| WO | 2006/001308 A1 | 5/2006 |

* cited by examiner

APPARATUS AND METHOD FOR CONFIGURING A RELAY FRAME CONTROL HEADER IN A MULTI-HOP RELAY BROADBAND WIRELESS ACCESS COMMUNICATION SYSTEM

PRIORITY

This application claims the benefit under 35 U.S.C. §119(a) of a Korean patent application filed in the Korean Intellectual Property Office on Oct. 27, 2006 and assigned Serial No. 2006-105328, the entire disclosure of which is hereby incorporated by reference.

BACKGROUND OF THE INVENTION

1. Field of the Invention

The present invention relates to a multi-hop relay Broadband Wireless Access (BWA) communication system. More particularly, the present invention relates to a method of configuring a Relay-Frame Control Header (R-FCH).

2. Description of the Related Art

In the next generation communication system, known as the 4th Generation (4G) communication system, research is actively in progress to provide a Quality of Service (QoS) with a data transfer speed of about 100 Mbps. In particular, in a Broadband Wireless Access (BWA) communication system, such as a wireless Local Area Network (LAN) system and a wireless Metropolitan Area Network (MAN) system, research is being conducted on a communication system that supports a high speed service while ensuring mobility and QoS. Examples of such a communication system are an Institute of Electrical and Electronics Engineers (IEEE) 802.16d communication system and an IEEE 802.16e communication system, each of which standard is hereby incorporated by reference.

The IEEE 802.16d communication system, as well as the IEEE 802.16e communication system, employs an Orthogonal Frequency Division Multiplexing (OFDM)/Orthogonal Frequency Division Multiple Access (OFDMA) scheme so that a physical channel of the wireless MAN system can support a broadband access network. The IEEE 802.16d communication system is implemented in consideration of only a single cell structure in a state that a Subscriber Station (SS) is fixedly located. That is, a mobility of the SS is not taken into consideration. Unlike the IEEE 802.16d communication system, the IEEE 802.16e communication system considers the mobility of the SS. A mobile SS will hereinafter be referred to as a Mobile Station (MS).

Figure 1:
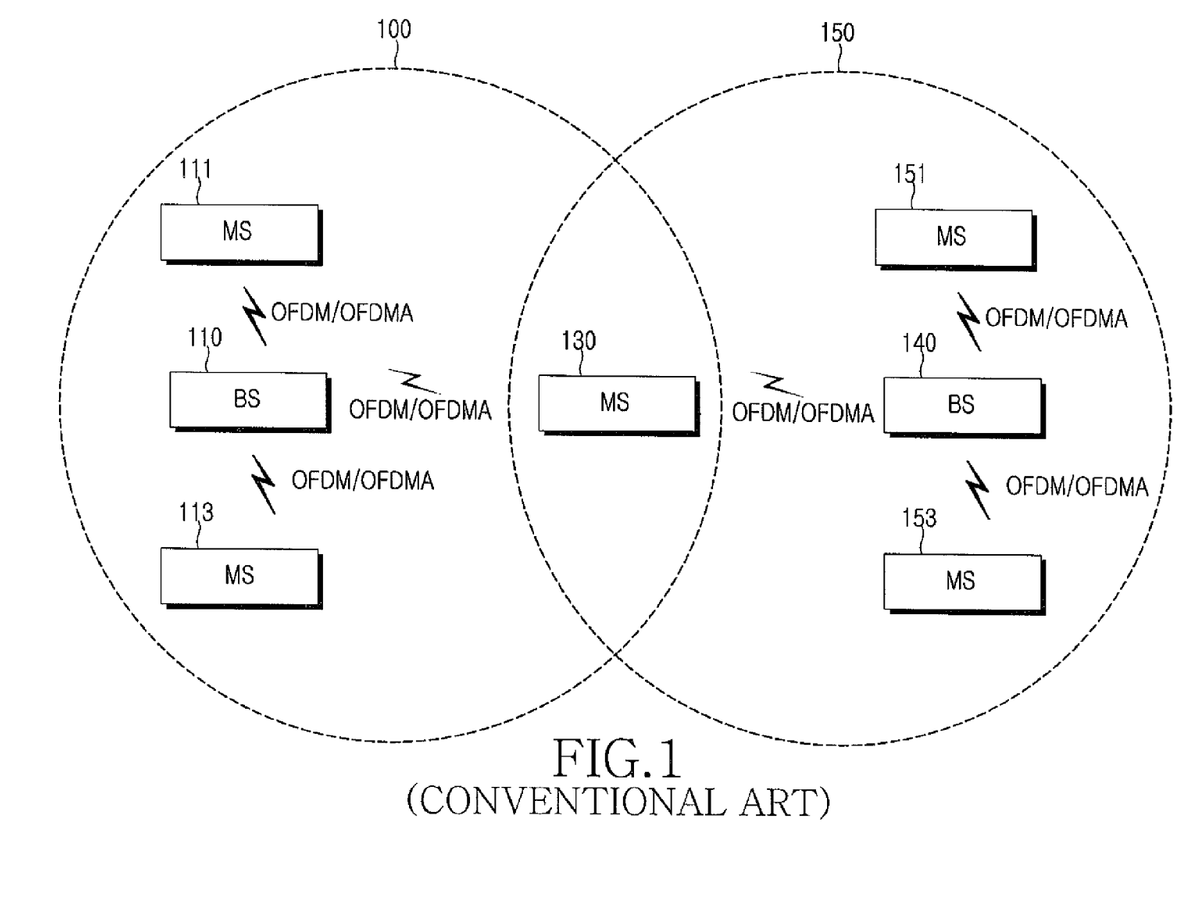
FIG. 1 is a schematic view illustrating a configuration of a conventional Institute of Electrical and Electronics Engineers (IEEE) 802.16e communication system.

FIG. 1 is a schematic view illustrating a configuration of a conventional IEEE 802.16e communication system.

Referring to FIG. 1, the IEEE 802.16e communication system, which has a multi-cell structure, includes cells 100 and 150, Base Stations (BSs) 110 and 140 for respectively managing the cells 100 and 150, and a plurality of MSs 111, 113, 130, 151, and 153. Signal communication between the BSs 110 and 140 and the MSs 111, 113, 130, 151, and 153 is performed by using the OFDM/OFDMA scheme. Among the MSs 111, 113, 130, 151, and 153, the MS 130 is located in a boundary area (i.e., handover area) between the cell 100 and the cell 150. Thus, when the MS 130 moves towards the cell 150 managed by the BS 140 while performing signal communication with the BS 110, the BS that serves the MS 130 changes from the BS 110 to the BS 140.

Since signaling is performed between an MS and a fixed BS via a direct link as shown in FIG. 1, a highly reliable wireless communication link can be established between the BS and the MS in the conventional IEEE 802.16e communication system. However, due to the fixed location of the BS in the IEEE 802.16e communication system, a wireless network cannot be configured with high flexibility. Thus, there is a limitation in that communication services cannot be effectively provided in a wireless environment where traffic distribution and call demands rapidly change.

These problems may be addressed by applying a multi-hop relay data transmission scheme to a conventional cellular wireless communication system such as the IEEE 802.16e communication system by using fixed Relay Stations (RSs), mobile RSs, or general MSs. In a multi-hop relay wireless communication system, a network can be rapidly reconfigured in response to a change in the surrounding environment and the entire wireless network can be further effectively managed. For example, the multi-hop relay wireless communication system can expand cell coverage and increase system capacity. That is, when a channel state is poor between a BS and an MS, an RS may be installed between the BS and the MS so that a multi-hop relay path is formed through the RS, thereby providing the MS with a wireless channel having a better channel state. Moreover, since the multi-hop relay scheme may be used in a cell boundary area, where a channel state between a BS and an MS is poor, it is possible to provide a high-speed data channel and to expand cell coverage.

A configuration of a conventional multi-hop relay wireless communication system for expanding a BS coverage area will now be described.

Figure 2:
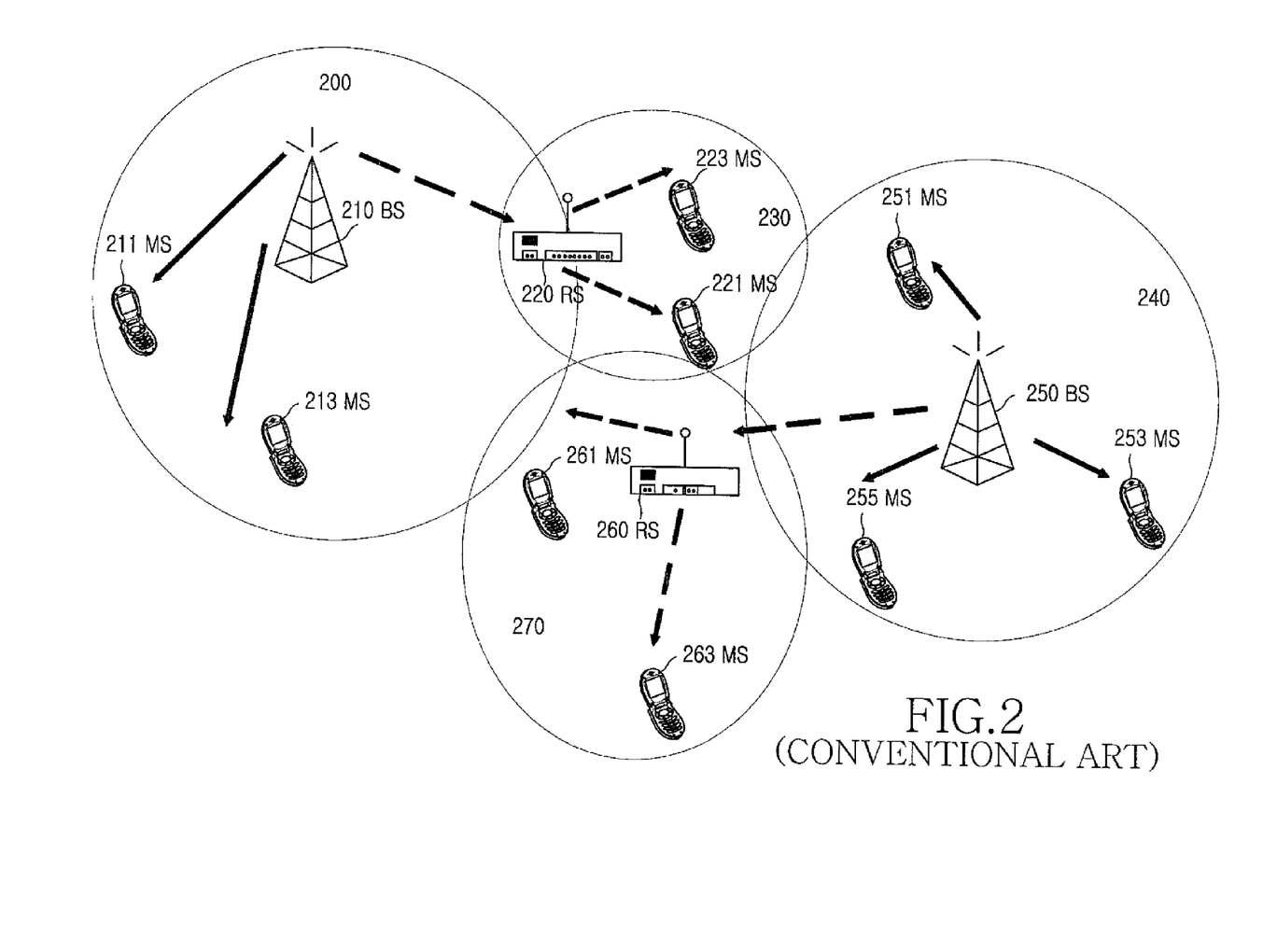
FIG. 2 is a schematic view illustrating a configuration of a conventional multi-hop relay Broadband Wireless Access (BWA) communication system for expanding a Base Station (BS) coverage area.

FIG. 2 is a schematic view illustrating a configuration of a conventional multi-hop relay BWA communication system for expanding a BS coverage area.

Referring to FIG. 2, the multi-hop relay BWA communication system, which is configured in a multi-cell structure, includes cells 200 and 240, BSs 210 and 250 for respectively managing the cells 200 and 240, a plurality of MSs 211 and 213 located inside a coverage area of the cell 200, a plurality of MSs 221 and 223 managed by the BS 210 but located in an area 230 outside the cell 200, an RS 220 for providing a multi-hop relay path between the BS 120 and the MSs 221 and 223 located inside the area 230, a plurality of MSs 251, 253, and 255 located inside a coverage area of the cell 240, a plurality of MSs 261 and 263 managed by the BS 250 but located in an area 270 outside the cell 240, and an RS 260 for providing a multi-hop relay path between the BS 250 and the MSs 261 and 263 located inside the area 270, The OFDM/OFDMA scheme is used when signal communication is performed among the BSs 210 and 250, the RSs 220 and 260, and the MSs 211, 213, 221, 223, 251, 253, 255, 261, and 263.

In the multi-hop relay BWA communication system of FIG. 2, the RSs 220 and 260 may be infrastructure RSs, which are installed by service providers and thus known and managed by the BSs 210 and 250. Alternatively, the RSs 220 and 260 may be client RSs which act as user terminals (i.e., SSs or MSs) or may be RSs according to other circumstances. Furthermore, the RSs 220 and 260 may be fixed RSs, or nomadic RSs (e.g., laptop computers) having nomadic capability, or mobile RSs having the same mobility as MSs.

When an RS is used to expand a cell area, a frame structure among a BS, the RS and an MS has to be defined by expanding a conventional frame structure defined between the BS and the MS. That is, the BS has to define a frame structure such that communication between RSs and MSs can be achieved based on one communication platform. For this, a Downlink (DL) frame of the BS is divided into a BS-MS area, in which communication is performed between a BS and an MS, and a BS-RS area in which communication is performed between a BS and an RS. Likewise, an Uplink (UL) frame of the BS is divided into an MS-BS area, in which communication is performed between an MS and a BS, and an RS-BS area in which communication is performed between an RS and a BS. The BS transmits to the MS a MAP including allocation information on the BS-MS area. Further, the BS transmits to the MS a Frame Control Header (FCH) including information required to decode the MAP. The FCH transmitted to the MS by the BS will hereinafter be simply referred to as M-FCH. The M-FCH has a format described in Table 1 below.

TABLE 1

| Syntax | Size | Notes |
|---|---|---|
| DL_Frame_Prefix_format( ) { | | |
| Used subchannel bitmap | 6 bits | Bit #0: subchannel group 0 |
| | | Bit #1: subchannel group 1 |
| | | Bit #2: subchannel group 2 |
| | | Bit #3: subchannel group 3 |
| | | Bit #4: subchannel group 4 |
| | | Bit #5: subchannel group 5 |
| Reserved | 1 bit | shall be set to zero |
| Repetition_coding_indication | 2 bits | 0b00: No repetition coding on DL-MAP |
| | | 0b01: Repetition coding of 2 used on DL-MAP |
| | | 0b10: Repetition coding of 4 used on DL-MAP |
| | | 0b11: Repetition coding of 6 used on DL-MAP |
| Coding_indication | 3 bits | 0b000: CC encoding used on DL-MAP |
| | | 0b001: BTC encoding used on DL-MAP |
| | | 0b010: CTC encoding used on DL-MAP |
| | | 0b011: ZT CC encoding used on DL-MAP |
| | | 0b100: CC encoding with optional interleaver |
| | | 0b101: LDPC encoding used on DL-MAP |
| | | 0b110-0b111: Reserved |
| DL-MAP length | 8 bits | — |
| Reserved | 4 bits | shall be set to zero |
| } | | |

As shown in Table 1, the M-FCH includes sub-channel group information (i.e., Used subchannel bitmap), DL-MAP repetition coding indication information (i.e., Repetition_coding_indication), DL-MAP coding indication information (i.e., Coding_indication), and DL-MAP length information (i.e., DL-MAP length).

Similar to the BS-MS area, the BS transmits to the RS a MAP including allocation information on the BS-RS area and the RS obtains the allocation information by decoding the MAP. Therefore, in order for the RS to process the MAP there is a need to define signaling such as the M-FCH of Table 1.

SUMMARY OF THE INVENTION

An aspect of the present invention is to address at least the above-mentioned problems and/or disadvantages and to provide at least the advantages described below. Accordingly, an aspect of the present invention is to provide an apparatus and method for configuring a Relay-Frame Control Header (R-FCH) that is delivered in a first front portion of an intermediary link area through which communication is performed between a Base Station (BS) and a Relay Station (RS) in a multi-hop relay Broadband Wireless Access (BWA) communication system.

Another aspect of the present invention is to provide an apparatus and method for dynamically providing Modulation and Coding Scheme (MCS) information on an RS Downlink (DL)-MAP (or simply referred to as R-MAP) in consideration of a channel state between a BS and an RS in a multi-hop relay BWA communication system.

According to an aspect of the present invention, a method of transmitting an R-FCH in a BS of a BWA communication system is provided. The method includes determining a modulation scheme of an K-MAP in consideration of a channel state with the RS while at least one of an initial network entry process is performed by the RS and a communication with the RS is performed in a BS-RS area where communication is made with RSs connected to the BS and transmitting a message including the determined modulation scheme to the RS.

According to another aspect of the present invention, a method of decoding an R-MAP in an RS of a BWA communication system is provided. The method includes receiving from a BS a message including a modulation scheme of the R-MAP while an initial network entry process is performed by the BS or while communication with the BS is performed in a BS-RS area where communication is made with BSs connected to the RS and decoding the R-MAP by using the modulation scheme.

According to another aspect of the present invention, an apparatus for transmitting an R-FCH in a BS of a BWA communication system is provided. The apparatus includes a controller for determining a modulation scheme of an R-MAP in consideration of a channel state with the RS while at least one of an initial network entry process is performed by the RS and a communication with the RS is performed in a BS-RS area where communication is made with RSs connected to the BS and a message generator for generating a message including the determined modulation scheme and for transmitting the generated message to the RS.

According to yet anther aspect of the present invention, an apparatus for decoding an R-MAP in an RS of a BWA communication system is provided. The apparatus includes a message processor for receiving from a BS a message including a modulation scheme of the R-MAP while at least one of an initial network entry process is performed by the BS and a communication with the BS is performed in a BS-RS area where communication is made with BSs connected to the RS and for extracting from the message a modulation scheme of the R-MAP and a controller for decoding the R-MAP by using the extracted modulation scheme.

BRIEF DESCRIPTION OF THE DRAWINGS

The above and other aspects, features and advantages of certain exemplary embodiments of the present invention will become more apparent from the following detailed description when taken in conjunction with the accompanying drawings in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness. Terminology used herein should be determined in consideration of functionality of the present invention and it may be variable depending on a user's or operator's intention, or customs in the art. Therefore, corresponding meanings should be determined with reference to the entire specification.

The present invention proposes the signaling of a Relay-Frame Control Header (R-FCH), required to decode a MAP, that provides a Relay Station (RS) with allocation information on an intermediary link area in a multi-hop relay Broadband Wireless Access (BWA) communication system. The intermediary link area is an area through which information to be relayed to a Mobile Station (MS) is transmitted.

The multi-hop relay scheme BWA communication system may use an Orthogonal Frequency Division Multiplexing (OFDM)/Orthogonal Frequency Division Multiple Access (OFDMA) scheme. Since the multi-hop relay BWA communication system operates by using the OFDM/OFDMA scheme, a physical channel signal is delivered using a plurality of sub-carriers, thereby enabling high-speed data transmission. Further, a mobility of the MS can be supported in a multi-cell structure.

An RS of the multi-hop relay BWA communication system may be either a fixed node or a mobile node. Further, the RS may be a specific system installed near to a Base Station (BS). An arbitrary node having the aforementioned characteristics may be selected as an RS according to a predefined standard through a capacity negotiation procedure between the RS and the BS, so that the BS has an expanded cell area and an improved cell capacity.

A BWA communication system using multiple carriers will be explained as an example in the following descriptions. However, the present invention may also apply to other cellular-based communication systems as long as a multi-hop relay scheme is used.

Figure 3A:
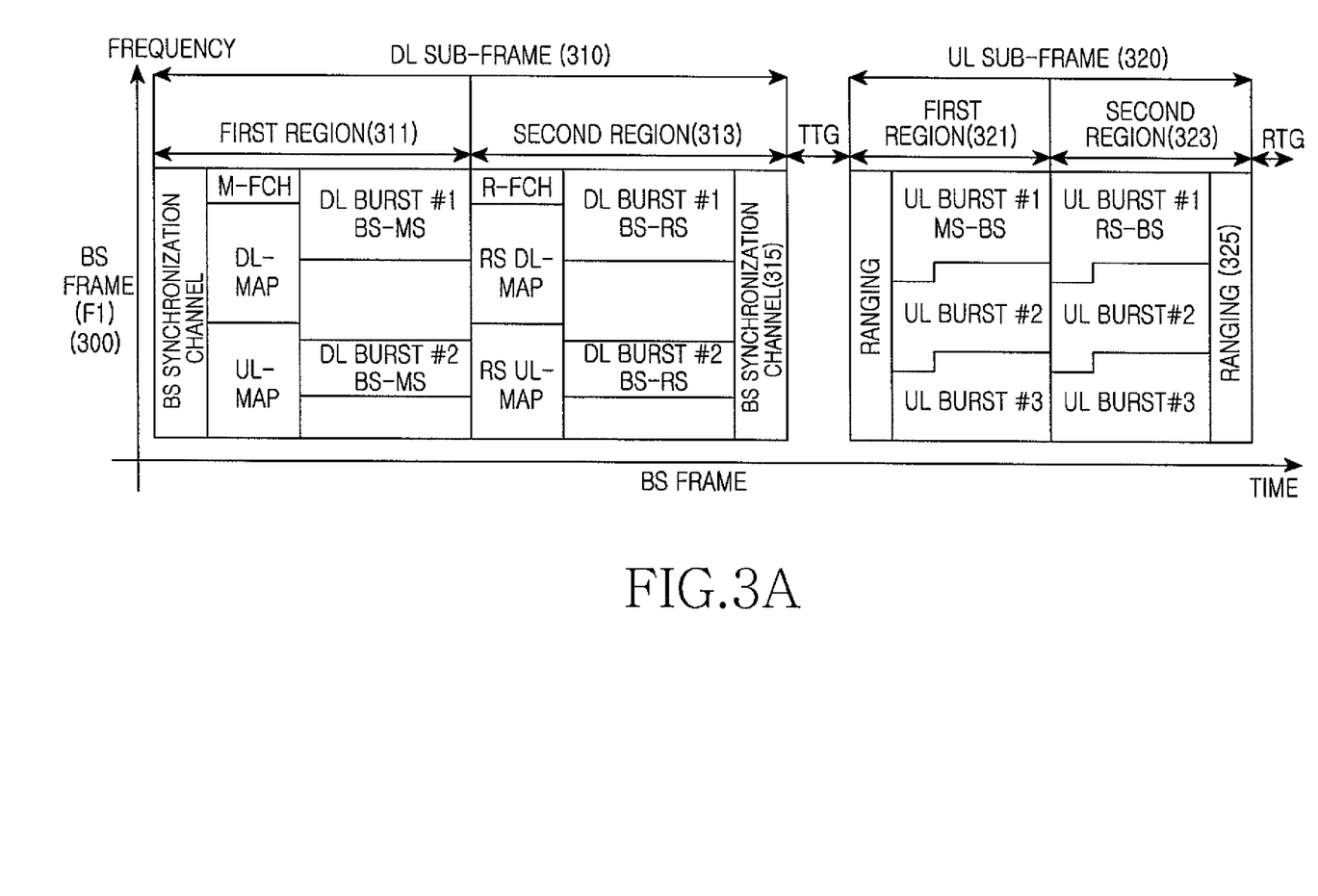
FIGS. 3A and 3B illustrate frame structures for providing a synchronization channel that is synchronized with a Mobile Station (MS) or a Relay Station (RS) in a multi-hop relay BWA communication system according to an exemplary embodiment of the present invention.
Figure 3B:
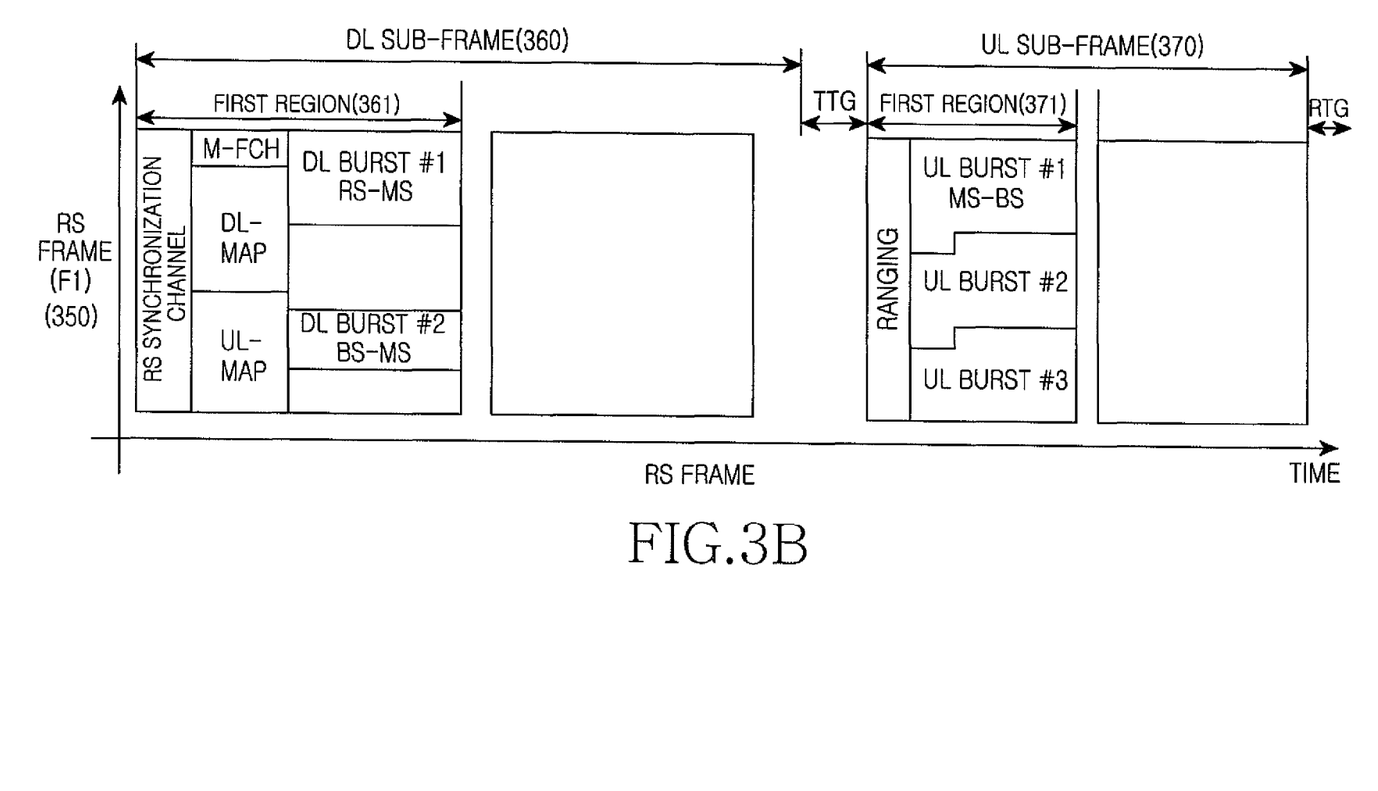

FIGS. 3A and 3B illustrate frame structures for providing a synchronization channel that is synchronized with an MS or an RS in a multi-hop relay BWA communication system according to an exemplary embodiment of the present invention.

Referring to the frame structures of FIGS. 3A and 3B, a synchronization channel in a preamble is provided to facilitate synchronization and cell search operations of the MS. Further, a synchronization channel in a postamble is provided to facilitate synchronization and cell search operations of the RS. As such, the BS configures a front portion and a rear portion of a DL sub-frame 310 of a BS frame 300 as a synchronization channel, and thus the MS or the RS can obtain synchronization information and adjacent BS information from the synchronization channel located in a predetermined position.

Unilateral sub-frames 310 and 320 of the BS frame 300 are time-multiplexed into first regions 311 and 321 and second regions 313 and 323. The lengths of the first regions 311 and 321 and the second regions 313 and 323 may be fixed or dynamically change according to a cell environment.

In the first regions 311 and 321 of the BS frame 300, the BS communicates with a plurality of MSs connected through a direct link. In the second regions 313 and 323, the BS communicates with a plurality of RSs. The first regions 311 and 321 and the second regions 313 and 323 may have dynamically variable sizes according to the cell environment Thus, in order to provide synchronization channels synchronized with the MSs and the RSs, the BS allocates synchronization channels or access channels to front portions of the first regions 311 and 321 and rear portions of the second regions 313 and 323. According to an alternative embodiment, in a UL sub-frame 320 of the BS frame 300, the access channel (i.e., ranging slot) may be determined through a control channel instead of being determined according to a predetermined position.

An RS communicates with MSs connected through a direct link in first regions 361 and 371 of an RS frame 350. First regions 361 and 371 are respectively located in sub-frames 360 and 370 of RS frame 350. The RS allocates synchronization channels or access channels to front portions of the first regions 361 and 371 so that the synchronized synchronization channels are provided to the MSs.

After allocating the synchronization channels to the front portions of the first regions 311 and 361, the BS or the RS may transmit the M-FCH of Table 1. In addition, the MSs may decode a subsequent DL-MAP by using a modulation scheme assigned to the M-FCH and the DL-MAP. In an exemplary implementation, the modulation scheme assigned to the DL- MAP uses Quadrature Phase Shift Keying (QPSK) ½ and is a robust modulation scheme in which an MS located in a cell boundary area can erroneously receive the DL-MAP.

Similar to the case of the first regions, when a BS communicates with an RS in a front portion of the second region 313, the BS transmits an R-FCH to the RS. Thus, information required to decode an RS DL-MAP (hereinafter, simply referred to as R-MAP) is transmitted to the RS, wherein the R-MAP is transmitted in the second region 313. In this case, if the R-FCH is assumed to have the same structure as the M-FCH of Table 1, in order to decode the R-MAP, the RS may use information included in the R-FCH and a modulation scheme assigned to the DL-MAP.

If the RS uses a directional antenna or performs line-of-sight communication, a channel environment between the RS and the BS is superior to a channel environment between the MS and the BS or between the MS and the RS. Therefore, the BS may encode the R-MAP by allowing the RS to use a modulation scheme which is even less robust than the modulation scheme used by the MS. The modulation scheme used in the R-MAP may use a variable value according to a channel state between the RS and the BS rather than using a fixed value.

Thus, exemplary embodiments of the present invention propose a new R-FCH including coding information required to decode the R-MAP. Furthermore, the R-FCH includes a modulation scheme for the R-MAP in consideration of a channel state between the BS and the RS.

The R-FCH providing the information required to decode the R-MAP proposed in an exemplary embodiment of the present invention has a format described in Table 2 below.

mation on whether a start offset is modified and information on the increase or decrease of the start offset. The DIUC index information indicates which type of MCS will be used in the R-MAP.

The DIUC index information includes MCS information as described in Table 3 below.

TABLE 3

| DIUC | TLV | | | MCS |
| | Type (1 byte) | Length (byte) | Value | |
| --- | --- | --- | --- | --- |
| 0 | 150 | 1 | 13 | QPSK (CTC) ½ |
| 1 | 150 | 1 | 15 | QPSK (CTC) ¾ |
| 2 | 150 | 1 | 16 | 16QAM (CTC) ½ |
| 3 | 150 | 1 | 17 | 16QAM (CTC) ¾ |
| 4 | 150 | 1 | 18 | 64QAM (CTC) ½ |
| 5 | 150 | 1 | 19 | 64QAM (CTC) ⅔ |
| 6 | 150 | 1 | 20 | 64QAM (CTC) ¾ |
| 7 | 150 | 1 | 21 | 64QAM (CTC) ⅚ |
| 8 | 150 | 1 | 0 | QPSK (CC) ½ |
| 9 | 150 | 1 | 1 | QPSK (CC) ¾ |
| 10 | 150 | 1 | 2 | 16QAM (CC) ½ |
| 11 | 150 | 1 | 3 | 16QAM (CC) ¾ |
| 12 | 150 | 1 | 4 | 64QAM (CC) ½ |

As shown in Table 3, a DIUC index indicates MCS information and corresponds to DIUC index information that is mapped to a combination of coding information and modulation information for the R-MAP transmitted in the BS-RS area. The DIUC index information of Table 3 is provided by using a Downlink Channel Descriptor (DCD) message that is broadcast through the first region 311 by the BS. In the first

TABLE 2

| Syntax | Size | Notes |
| --- | --- | --- |
| R-Zone_Prefix_format( ) { | | |
| Used_subchannel_bitmap | 6 bits | Bit #0: subchannel group 0 |
| | | Bit #1: subchannel group 1 |
| | | Bit #2: subchannel group 2 |
| | | Bit #3: subchannel group 3 |
| | | Bit #4: subchannel group 4 |
| | | Bit #5: subchannel group 5 |
| Repetition_Coding_Indication | 2 bits | 0b00: No repetition coding on R-MAP |
| | | 0b01: Repetition coding of 2 used on R-MAP |
| | | 0b10: Repetition coding of 4 used on R-MAP |
| | | 0b11: reserved |
| FEC Code type and modulation type | 4 bits | DIUC index (see Table 3) |
| R-MAP_length | 8 bits | |
| R-Zone_Location | 4 bits | Indicate whether the offset of DL-Relay zone in next frame is changed. If this field is set to 0b0000, there is no change in the offset of DL-Relay zone of next frame. Otherwise, this field includes the increase or decrease of the offset of DL-Relay zone in next frame. 0b0000: no change 0b0xxx: xxx symbols increase 0b1xxx: xxx symbols decrease |
| } | | |

As shown in Table 2, the R-FCH includes sub-channel group information (i.e., Used_subchannel_bitmap) in the BS-RS area, repetition coding indication information (i.e., Repetition_Coding_Indication) of the R-MAP transmitted in the RS-BS area, Downlink Interval Usage Code (DIUC) index information (i.e., FEC code type and modulation type) indicating a Modulation and Coding Scheme (MCS) for the R-MAP, R-MAP length information (i.e., R-MAP length) indicating a length of the R-MAP, and start offset information (i.e., R-Zone_Location) of a BS-RS area in a next frame. The start offset information of the BS-RS area may include inforregion 311, the RS receives the DCD message while the RS and the BS perform an initial network entry process and thus obtains the DIUC index information of Table 3. After performing the initial network entry process, the DIUC index information may be used without alteration in the communication with the BS, which is performed in the second region 313.

The R-FCH may include information of Table 2 other than the sub-channel group information (i.e., Used_subchannel_bitmap) in the BS-RS area. The sub-channel group information (i.e., Used_subchannel_bitmap) in the BS-RS area may be transmitted by using another signaling message transmitted between the BS and the RS. The signaling message indicating the sub-channel group information is beyond the scope of the present invention and thus detailed descriptions thereof will be omitted.

The R-FCH excluding the sub-channel group information (i.e., Used_subchannel_bitmap) in the BS-RS area has a format described in Table 4 below.

TABLE 4

| Syntax | Size | Notes |
|---|---|---|
| R-Zone_Prefix_format( ) { | | |
| Repetition_Coding_Indication | 2 bits | 0b00: No repetition coding on R-MAP |
| | | 0b01: Repetition coding of 2 used on R-MAP |
| | | 0b10: Repetition coding of 4 used on R-MAP |
| | | 0b11: reserved |
| FEC Code type and modulation type | 4 bits | DIUC index (see Table 3) |
| R-MAP length | 8 bits | — |
| R-Zone_Location | 5 bits | Indicate whether the offset of DL-Relay zone in next frame is changed. If this field is set to 0b00000, there is no change in the offset of DL-Relay zone of next frame. Otherwise, this field includes the increase or decrease of the offset of DL-Relay zone in next frame. |
| | | 0b00000: no change |
| | | 0b0xxxx: xxxx symbols increase |
| | | 0b1xxxx: xxxx symbols decrease |
| reserved | 5 bits | shall be set to zero |
| } | | |

The R-FCH of Table 4 includes repetition coding indication information (i.e., Repetition_Coding_Indication) of the R-MAP transmitted in the BS-RS area, DIUC index information (i.e., FEC Code type and modulation type) indicating an MCS for the R-MAP, R-MAP length information (i.e., R-MAP length) indicating a length of the R-MAP, and start offset information (i.e., R-Zone_Location) of a BS-RS area in a next frame.

Figure 4:
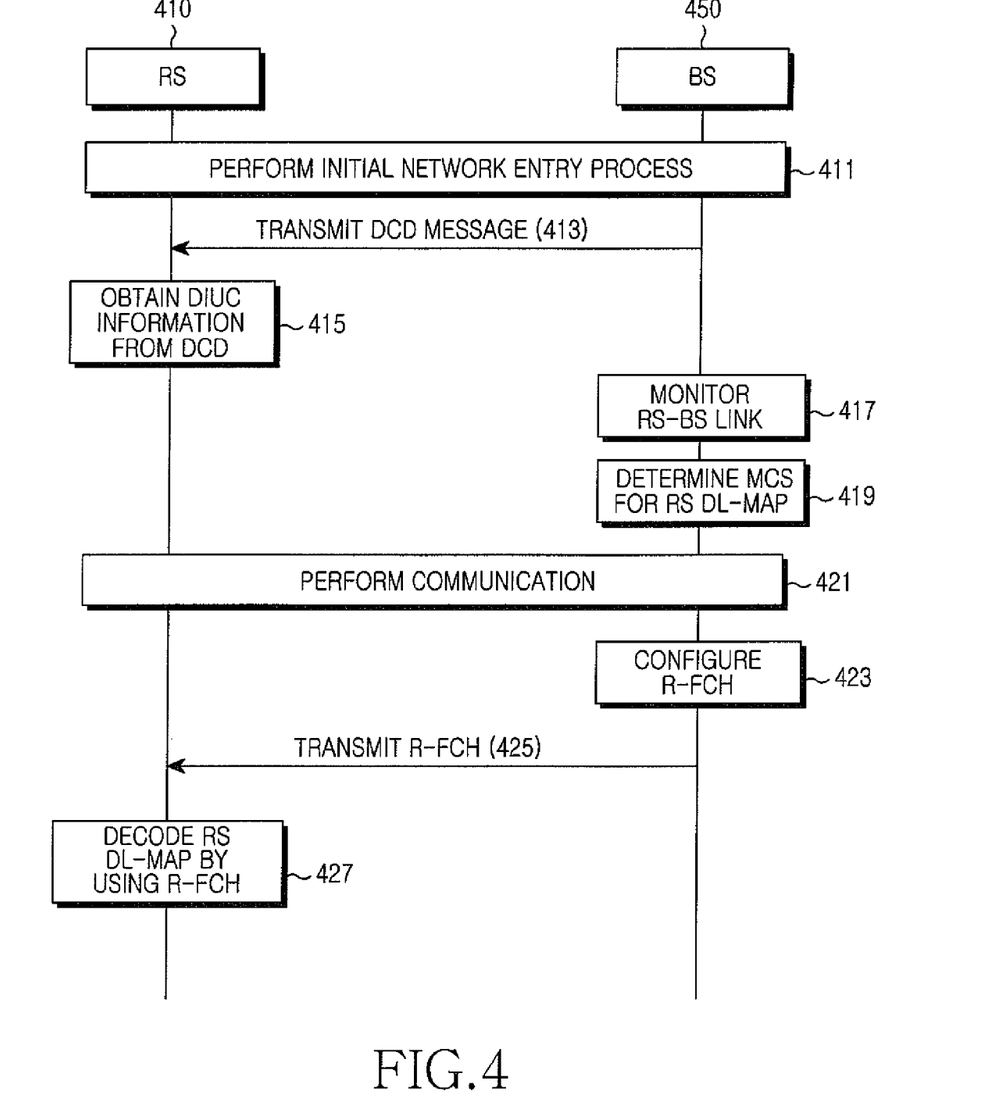
FIG. 4 illustrates a signal flow between an RS and a BS, in which Modulation and Coding Scheme (MCS) information of an RS Downlink (DL)-MAP (or simply referred to as R-MAP) is provided by using a Relay-Frame Control Header (R-FCH) in a multi-hop relay BWA communication system according to an exemplary embodiment of the present invention.

FIG. 4 illustrates a signal flow between an RS and a BS, in which MCS information for an R-MAP is provided by using an R-FCH in a multi-hop relay BWA communication system, according to an exemplary embodiment of the present invention.

Referring to FIG. 4, an RS 410 and a BS 450 perform an initial network entry process in step 411. The initial network entry process of the RS 410 and the BS 450 is performed in the first regions 311 and 321 of the BS frame 300 in the frame structure of FIG. 3A. That is, a DL message required in the initial network entry process is transmitted to the RS 410 through the first downlink region 311 and an UL message is transmitted to the BS 450 through the first uplink region 321.

In step 413, the BS 450 transmits a DOD message used in the first DL region 311. The DCD message includes DIUC index information indicating the MCS information of Table 3. In step 415, the DIUC index information indicating the MCS information of Table 3 is obtained by receiving the DCD message.

In step 417, the BS 450 monitors a channel state with the RS 410 performing the initial network entry process through the first regions 311 and 321. To recognize the channel state with the RS 410, the BS 450 may allocate a Channel Quality Information CHannel (CQICH) to the RS 410 so that the RS 410 can report a Signal to Noise Ratio (SNR) through the allocated CQICH. In step 419, according to the result obtained by monitoring the channel state with the RS 410, the BS 450 determines an MCS for the R-MAP.

In step 421, the RS 410 and the BS 450 terminate the initial network entry process and then perform communication for providing a relay service to an MS through the second regions 313 and 323 of FIG. 3A. In step 423, the BS 450 configures the R-FCH of Table 2 or Table 4 to be transmitted in a first front portion of the second region 313. In step 425, the BS 450 transmits the configured R-FCH to the RS 410. The R-FCH includes the DIUC index information of Table 3, which is mapped to the MCS determined in step 419.

In step 427, the RS 410 receives the R-FCH from the BS 450 and thus obtains information required to decode the R-MAP when received. To analyze the DIUC index information included in the R-FCH, the RS 410 uses DIUC index information indicating the MCS information of Table 3 included in the DCD message which is received in step 415.

Meanwhile, after step 421, the BS 450 continues to monitor the channel state with the RS 410 while performing communication with the RS 410 through the second regions 313 and 323 of FIG. 3A. The monitoring result is utilized when configuring the R-FCH including the MOS information of the R-MAP. In addition to the monitoring result of the channel state with the RS 410, the BS 450 may determine the MCS information of the R-MAP in consideration of a result obtained by monitoring a channel state with another RS performing communication with the BS 450.

In the DIUC index field for the MCS of the R-FCH of Table 2 or Table 4, only a convolutional code or a convolutional turbo code is used as a coding scheme. However, when the R-MAP can use various coding schemes, the R-FCH may include the various coding schemes. In this case, instead of allowing the R-FCH to contain the DIUC index information indicating the MCS, information on the various MCSs may be additionally provided.

The R-FCH including the various coding schemes has a format described in Table 5 below.

TABLE 5

| Syntax | Size | Notes |
| --- | --- | --- |
| R-Zone_Prefix_format( ) { | | |
|   Repetition_Coding_Indication | 2 bits | 0b00: No repetition coding on R-MAP |
| | | 0b01: Repetition coding of 2 used on R-MAP |
| | | 0b10: Repetition coding of 4 used on R-MAP |
| | | 0b11: reserved |
|   Modulation_indication | 3 bits | 0b000: QPSK ½ |
| | | 0b001: QPSK ¾ |
| | | 0b010: 16QAM ½ |
| | | 0b011: 16QAM ¾ |
| | | 0b100: 64QAM ½ |
| | | 0b101: 64QAM ⅔ |
| | | 0b110: 64QAM ¾ |
| | | 0b111: 64QAM ⅚ |
|   Coding_indication | 3 bits | 0b000: CC encoding used on DL-MAP |
| | | 0b001: BTC encoding used on DL-MAP |
| | | 0b010: CTC encoding used on DL-MAP |
| | | 0b011: ZT CC encoding used on DL-MAP |
| | | 0b100: CC encoding with optional interleaver |
| | | 0b101: LDPC encoding used on DL-MAP |
| | | 0b110-0b111: Reserved |
|   R-MAP length | 8 bits | — |
|   R-Zone_Location | 5 bits | Indicate whether the offset of DL-Relay zone in next frame is changed. If this field is set to 0b00000, there is no change in the offset of DL-Relay zone of next frame. Otherwise, this field includes the increase or decrease of the offset of DL-Relay zone in next frame. |
| | | 0b00000: no change |
| | | 0b0xxxx: xxxx symbols increase |
| | | 0b1xxxx: xxxx symbols decrease |
|   reserved | 3 bits | shall be set to zero |
| } | | |

The R-FCH of Table 5 includes repetition coding indication information (i.e., Repetition_Coding_Indication) on the R-MAP transmitted in the BS-RS area, modulation scheme information (i.e., Modulation_indication) on the R-MAP, coding scheme information (i.e., Coding_indication) on the R-MAP, R-MAP length information (i.e., R-MAP length) indicating a length of the R-MAP and start offset information (i.e., R-Zone_Location) in a BS-RS area in a next frame.

In addition to the format including the modulation scheme information on the R-MAP as shown in Table 2, Table 4 or Table 5, the R-FCH may be used only when the modulation scheme changes. The R-FCH has a format described in Table 6 below.

TABLE 6

| Syntax | Size | Notes |
| --- | --- | --- |
| R-Zone_Prefix_format( ) { | | |
|   Used_subchannel_bitmap | 6 bits | Bit #0: subchannel group 0 |
| | | Bit #1: subchannel group 1 |
| | | Bit #2: subchannel group 2 |
| | | Bit #3: subchannel group 3 |
| | | Bit #4: subchannel group 4 |
| | | Bit #5: subchannel group 5 |
|   Repetition_Coding_Indication | 2 bits | 0b00: No repetition coding on R-MAP |
| | | 0b01: Repetition coding of 2 used on R-MAP |
| | | 0b10: Repetition coding of 4 used on R-MAP |
| | | 0b11: reserved |
|   Coding_indication | 3 bits | 0b000: CC encoding used on DL-MAP |
| | | 0b001: BTC encoding used on DL-MAP |
| | | 0b010: CTC encoding used on DL-MAP |
| | | 0b011: ZT CC encoding used on DL-MAP |
| | | 0b100: CC encoding with optional interleaver |
| | | 0b101: LDPC encoding used on DL-MAP |
| | | 0b110-0b111: Reserved |
|   R-MAP length | 8 bits | — |
|   R-Zone_Location | 5 bits | Indicate whether the offset of DL-Relay zone in next frame is changed. If this field is set to 0b00000, there is no change in the offset of DL-Relay zone of next frame. Otherwise, this field includes the increase or decrease of the offset of DL-Relay zone in next frame. |

TABLE 6-continued

| Syntax | Size | Notes |
| --- | --- | --- |
| | | 0b00000: no change |
| | | 0b0xxxx: xxxx symbols increase |
| | | 0b1xxxx: xxxx symbols decrease |
| } | | |

The R-FCH of Table 6 includes sub-channel group information (i.e., Used_subchannel_bitmap) in the BS-RS area, repetition coding indication information (i.e., Repetition_Coding_Indication) of the R-MAP transmitted in the BS-RS area, coding scheme information (i.e., coding_indication) on the R-MAP, R-MAP length information (i.e., R-MAP length) indicating a length of the R-MAP and start offset information (i.e., R-Zone_Location) of a BS-RS area in a next frame.

The R-FCH of Table 6 cannot provide modulation scheme information on the R-MAP. Thus, when the modulation scheme on the R-MAP is modified, the modified modulation scheme information has to be provided to the RS by using an additional signal. Examples of the additional signal include a message exchanged in the last step of the initial network entry process between the BS and the RS and an RS-Downlink Channel Descriptor (R-DCD) message that is broadcast in the BS-RS area by the BS.

R-MAP modulation indication information included in the additional signal providing the modified modulation scheme information has a format described in Table 7 below.

TABLE 7

| Syntax | Size | Notes |
| --- | --- | --- |
| R-MAP modulation indication( ) { | | |
| Modulation_indication | 3 bits | 0b000: QPSK ½ |
| | | 0b001: QPSK ¾ |
| | | 0b010: 16QAM ½ |
| | | 0b011: 16QAM ¾ |
| | | 0b100: 64QAM ½ |
| | | 0b101: 64QAM ⅔ |
| | | 0b110: 64QAM ¾ |
| | | 0b111: 64QAM ⅚ |

Referring to Table 7, the R-MAP modulation indication information may include information on a modulation scheme for the R-MAP.

Now, operations of a BS and an RS which handles a modification process of an R-MAP modulation scheme by using the R-FCH of Table 6 and by using R-MAP modulation indication information of Table 7 will be described with reference to FIG. 5 and FIG. 6.

Figure 5:
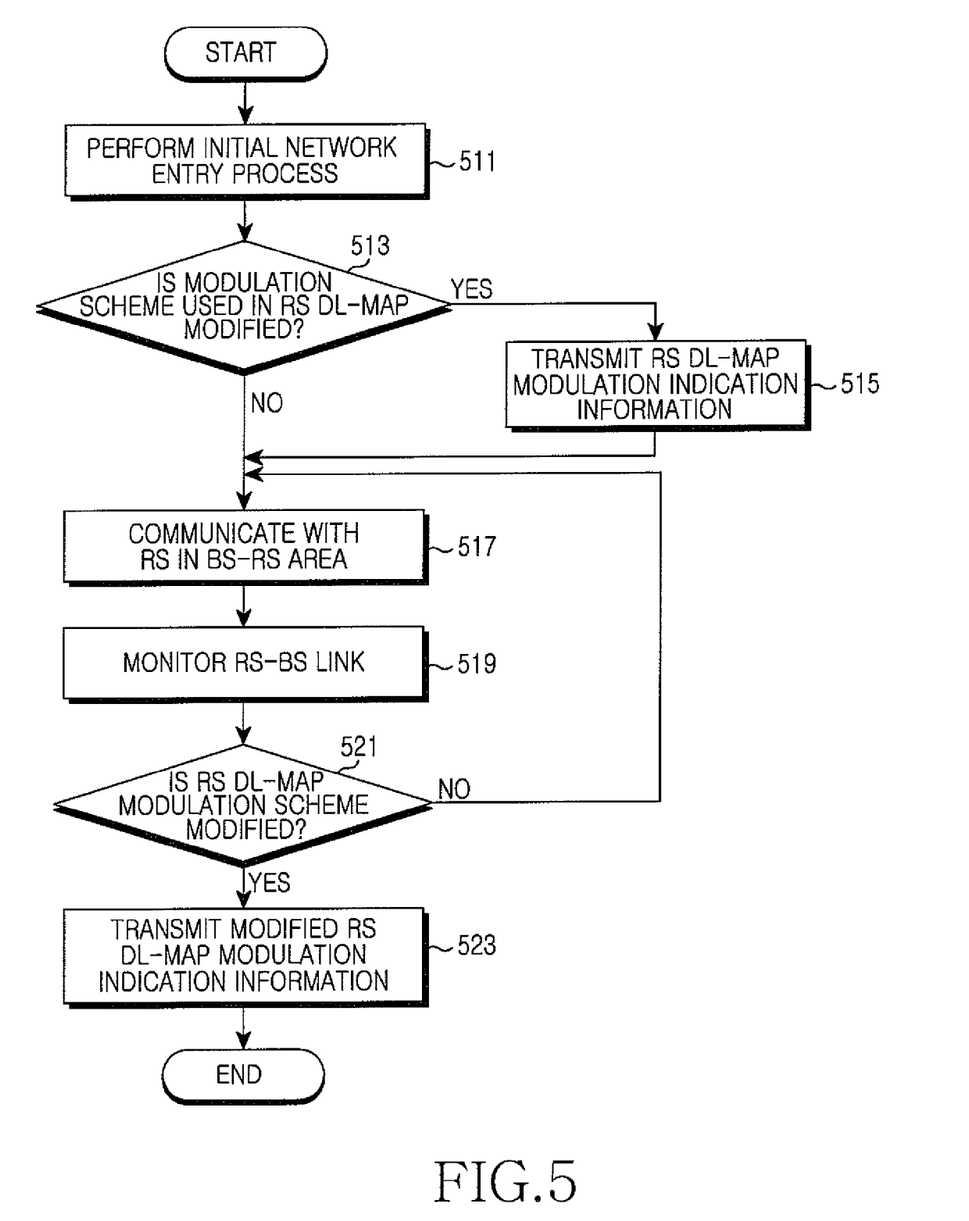
FIG. 5 is a flowchart illustrating an operation of a BS that instructs to change an R-MAP modulation scheme in a multi-hop relay BWA communication system according to an exemplary embodiment of the present invention.

FIG. 5 is a flowchart illustrating an operation of a BS that instructs to change an R-MAP modulation scheme in a multi-hop relay BWA communication system according to an exemplary embodiment of the present invention.

Referring to FIG. 5, in step 511, the BS and an RS perform an initial network entry process. In step 513, the BS continuously monitors a channel state with the RS, determines an R-MAP modulation scheme according to the monitoring result of the channel state with the RS and determines whether the modulation scheme used in the R-MAP has been changed from a modulation scheme used in the initial network entry process. If the result of step 513 indicates that the modulation scheme used in the R-MAP has been modified, in step 515, the BS transmits the R-MAP modulation indication information of Table 7 to the RS in order to indicate the modification of the R-MAP modulation scheme. In this case, the R-MAP modulation indication information of Table 7 may be included in a message exchanged in the last step of the initial network entry process. After the message including the R-MAP modulation indication information of Table 7 is transmitted in step 515, the BS communicates with the RS in the BS-RS area in step 517. On the other hand, if the result of step 513 indicates that the R-MAP modulation scheme has not been modified, the procedure directly proceeds to step 517 and thus the BS communicates with the RS in the BS-RS area.

In step 519, the BS continuously monitors a channel state with the RS while communicating with the RS in the BS-RS area To recognize the channel state with the RS, the BS may allocate a CQICH to the RS and thus allow the RS to report a received SNR through the allocated CQICH. In step 521, according to the monitoring result of the channel state with the RS, the BS determines the R-MAP modulation scheme and then determines whether the R-M modulation scheme has been modified.

If the result of step 521 indicates that the R-MAP modulation scheme has been modified, in step 523, the BS transmits to the RS a signal including the R-MAP modulation indication method of Table 7. The R-MAP modulation indication information of Table 7 may be included in an R-DCD message which is transmitted from the BS to RSs communicating in the BS-RS area. On the other hand, if the result of step 521 indicates that the R-MAP modulation scheme has not been modified, the procedure returns to step 517 and thus the BS continues to communicate in the BS-RS area. Thereafter, the procedure of FIG. 5 is ended.

Figure 6:
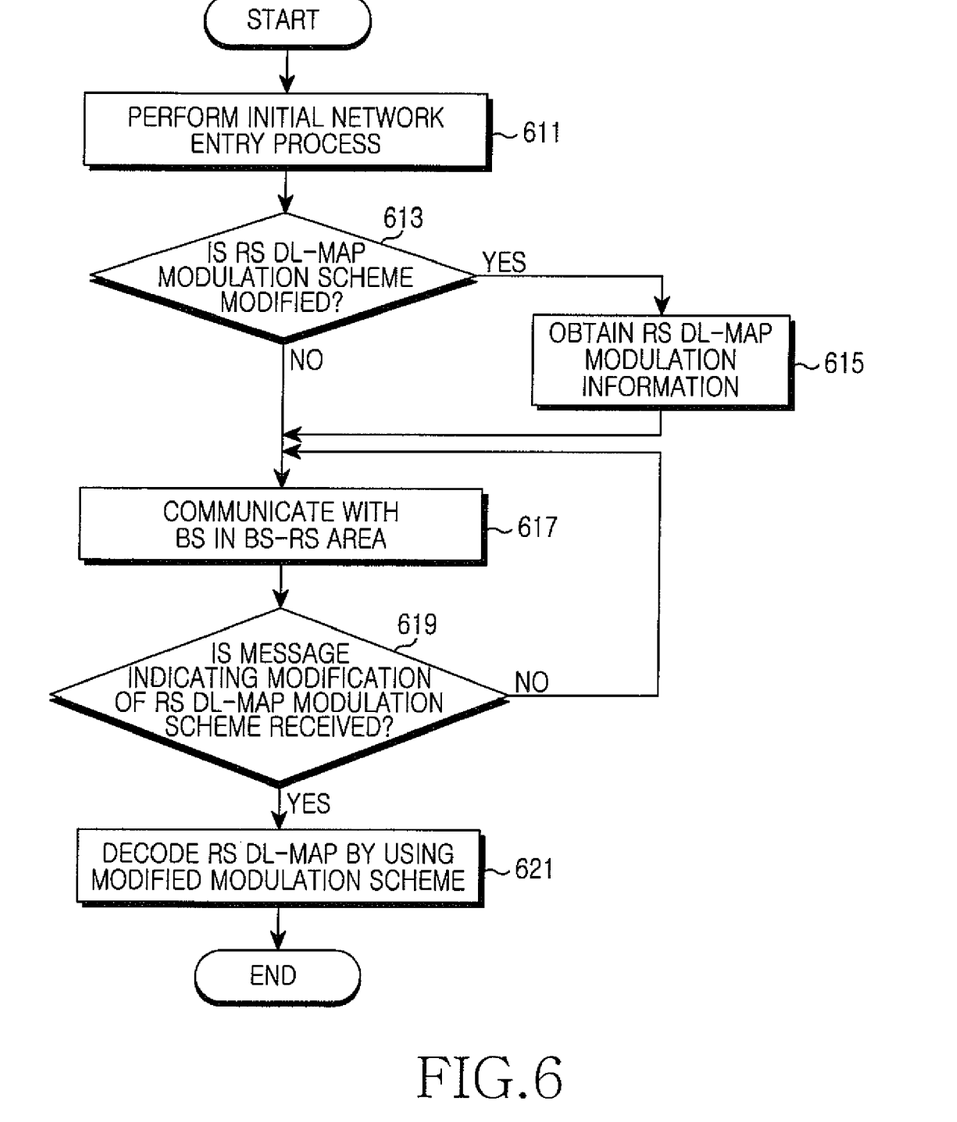
FIG. 6 is a flowchart illustrating an operation of an RS which receives modified R-MAP modulation information in a multi-hop relay BWA communication system according to an exemplary embodiment of the present invention.

FIG. 6 is a flowchart illustrating an operation of an RS which receives modified R-MAP modulation information in a multi-hop relay BWA communication system according to an exemplary embodiment of the present invention.

Referring to FIG. 6, in step 611, the RS and a BS perform an initial network entry process. In step 613, the RS determines whether a message that informs modification of the R-MAP modulation scheme has been received from the BS. Upon receiving the message in step 613, the RS obtains R-MAP modulation scheme information by using the message in step 615. This message corresponds to a message which includes the R-MAP modulation indication information of Table 7 and which is received from the BS by the RS in the last step of the initial network entry process. In step 617, the RS performs communication in the RS-BS area and decodes the R-MAP by using the R-FCH of Table 6 transmitted from the BS and by using the R-MAP modulation indication information obtained in step 615 and shown in Table 7.

On the other hand, if the result of step 613 indicates that the message including the R-MAP modulation indication information of Table 7 is not received from the BS in the last step of the initial network entry process, the RS recognizes that the DL MAP modulation scheme used in the initial network entry process performed by the BS is not modified, then the procedure proceeds to step 617 and thus the RS communicates with the BS in the BS-RS area. In this step, the RS decodes the R-MAP by using the R-FCH (shown in Table 6) received from the BS and by using the DL-MAP modulation scheme used in the initial network entry process.

In step 619, the RS determines whether the message including the R-MAP modulation indication information (shown in Table 7) indicating modification of the R-MAP modulation scheme is received. Upon receiving the message, the RS decodes the R-MAP by using the modified modulation scheme in step 621. The message received from the BS by the RS in step 619 may be an R-DCD message including the R-MAP modulation indication information of Table 7. If the message is not received from the BS in step 619, the procedure returns to step 617, and thus the RS continues to communicate with the BS. Thereafter, the procedure of FIG. 6 is ended.

In a case where a mobile RS is used in a system for informing an MCS for an R-MAP message by using information of Table 6 and information of Table 7, if communication has to be continuously performed in a target BS area after the mobile RS performs a handover to the target BS, it is necessary to know in advance which modulation scheme will be used for the R-MAP message transmitted by the target BS. Information on the modulation scheme for the R-MAP message may be provided by using a message having the structure described in Table 7. The message may be a backbone message exchanged between the target BS and a serving BS or a handover control message exchanged between the serving BS and the RS.

To facilitate smooth communication of the mobile RS performing handover, the target BS may transmit an R-MAP message transmitted by the target BS by allowing a modulation scheme for the R-MAP message to have the most robust value (e.g., QPSK ½). Thus, when the target BS receives a handover signal of the mobile RS from the serving BS, the target BS determines the modulation scheme for the R-MAP message to be the most robust value and transmits a message indicating the modified modulation scheme to all RSs communicating with the target BS.

General operations of a BS and an RS which transmit and receive BS-RS area information included in a frame of a multi-hop relay BWA communication system have been described above. Hereinafter, structures of the BS and the RS will be described. Since the BS and the RS have the same interface module (communication module), the BS and the RS have the same structure. Therefore, the operations of both the BS and the RS will now be described with reference to FIG. 7. In the following descriptions, a Time Division Duplex (TDD)-OFDMA system is assumed to be used. However, the present invention may also apply to a Frequency Division Duplex (FDD)-OFDMA system, a hybrid system using both the TDD and the FDD and a cellular-based system using another resource allocation method.

Figure 7:
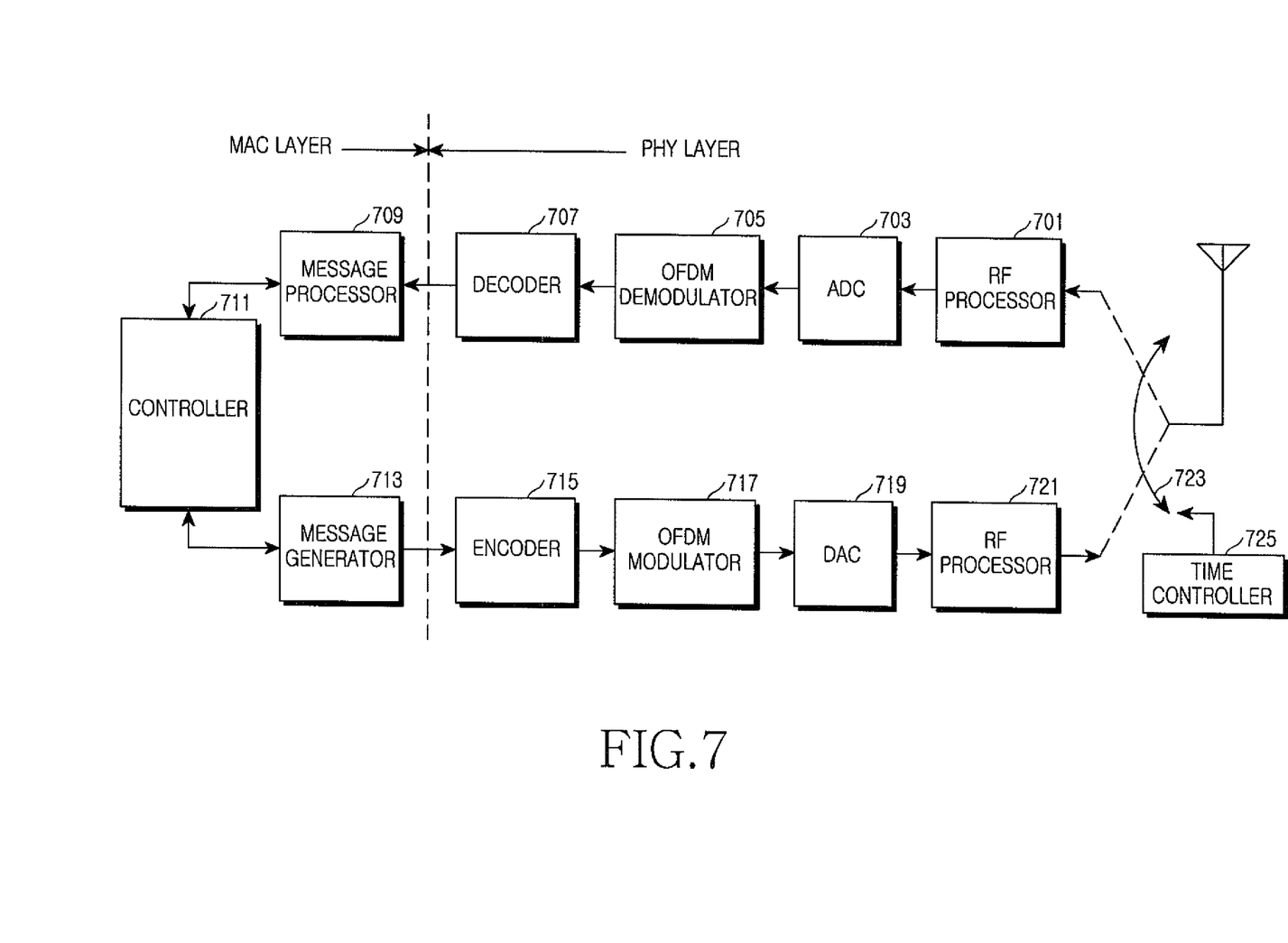
FIG. 7 is a block diagram illustrating a structure of a BS (or RS) according to an exemplary embodiment of the present invention.

FIG. 7 is a block diagram illustrating a structure of a BS (or RS) according to an exemplary embodiment of the present invention.

Referring to FIG. 7, the Bs (or RS) includes a Radio Frequency (RF) processor 701, an Analog/Digital Converter (ADC) 703, an OFDM demodulator 705, a decoder 707, a message processor 709, a controller 711, a message generator 713, an encoder 715, an OFDM modulator 717, a Digital/Analog Converter (DAC) 719, an RF processor 721, a switch 723 and a time controller 725.

The time controller 725 controls a switching operation of the switch 723 in synchronization with time. For example, when in a signal reception period, the time controller 725 controls the switch 723 so that an antenna is connected with the RF processor 701 in a receiving end, and when in a signal transmission period, the time controller 725 controls the switch 723 so that the antenna is connected with the RF processor 721 in a transmitting end.

During the signal reception period, the RF processor 701 converts an RF signal received through the antenna into a base-band analog signal. The ADC 703 converts the analog signal received from the RF processor 701 into sample data. The OFDM demodulator 705 performs a Fast Fourier Transform (FFT) operation on the sample data output from the ADC 703 and thus converts the sample data into frequency domain data. Then, the OFDM demodulator 705 selects data of sub-carriers to be received from the frequency domain data.

The decoder 707 demodulates and decodes the data received from the OFDM demodulator 705 according to a modulation level (i.e., MCS level).

The message processor 709 decomposes a control message input from the decoder 707 and provides the decomposition result to the controller 711. The controller 711 performs a specific process on information received from the message processor 709. Further, the controller 711 generates necessary information and then transmits the generated information to the message generator 713. The message generator 713 generates a message from various pieces of information received from the controller 711 and outputs the generated message to the encoder 715 in a physical layer.

The encoder 715 encodes and modulates data received from the message generator 713 according to a modulation level (i.e., MCS level). The OFDM modulator 717 performs an Inverse FFT (IFFT) operation on data received from the encoder 715 to obtain sample data (i.e., OFDM symbol). The DAC 719 converts the sample data into an analog signal. The RE processor 721 converts the analog signal received from the DAC 719 into an RF signal and transmits the RF signal through the antenna.

With the aforementioned structure, the controller 711 serves as a protocol controller and controls the message processor 709 and the message generator 713. That is, the controller 711 may perform functions of the message processor 709 and the message generator 713. Although the message processor 709 and the message generator 713 are distinctively implemented in the present invention, this is for exemplary purpose only. Thus, in practice, the controller 711 may perform both or either one of the functions of the message processor 709 and the message generator 713.

The controller 711 may receive information required during a protocol processing operation from a specific element in the physical layer or may generate a control signal and output the control signal to the element in the physical layer.

Now, operations of an RS and a BS will be described with reference to FIG. 7. The following descriptions will focus on control message processing performed in a Media Access Control (MAC) layer.

First, an operation of the BS will be described. The controller 711 controls overall operations according to an R-FCH structure of the present invention. When an initial access is performed on an arbitrary RS, the controller 711 generates DIUC index information indicating the MCS information of Table 3 and then provides the generated information to the message generator 713. Then, the message generator 713 generates a message including the DIUC index information generated by the controller 711 or a message including the R-MAP modulation indication information of Table 7 and then transmits the generated message to a physical layer. The message including the DIUC index information may use a DCD message including the MCS information of Table 3. The message including the R-MAP modulation indication information of Table 7 may use a message exchanged in the last step of the initial network entry process.

In addition, the controller 711 determines MCS information on the R-MAP to be included in the R-FCH which is transmitted in a first front portion of the BS-RS area, and then provides the determined MCS information to the message generator 713. The message generator 713 generates a message including the R-FCH of Table 2, Table 4, Table 5 or Table 6 or a message including the R-MAP modulation indication information of Table 7 by using the R-MAP MCS information provided by the controller 711.

Messages generated by the message generator 713 are processed to have a format that can be transmitted in the physical layer and are then transmitted via an antenna.

Now, an operation of an RS will be described. The message processor 709 decomposes a control message received from an MS or a BS, and then provides the decomposition result to the controller 711. Upon receiving from the BS the R-FCH of Table 2, Table 4, Table 5 or Table 6, the DCD message providing the DIUC index information of Table 3 or a message providing the RS DL-MAP modulation indication information of Table 7, the message processor 709 extracts various pieces of control information included in the received message and provides the extracted information to the controller 711.

On the basis of control information received from the message processor 709, the controller 711 recognizes the R-FCH transmitted in the first front portion of the BS-RS area for communication with the BS and recognizes information required to decode the R-MAP by using the recognized R-FCH. That is, the controller 711 controls overall operations required to act as an RS in the BS-RS area.

According to exemplary embodiments of the present invention, in a multi-hop relay BWA communication system, an R-FCH is configured which includes information required to decode R-MAP information transmitted in a BS-RS area through which a BS and an RS communicate. Further, a message indicating a MAP modulation scheme for decoding the R-MAP information is provided. Therefore, an MCS for the R-MAP can be determined in consideration of a channel state between the RS and the BS which provide a channel environment relatively superior to that between the BS and an MS. In addition, the MCS can be applied in various manners according to the channel state, thereby enabling effective use of resources.

Certain aspects of the present invention can also be embodied as computer readable code on a computer readable recording medium. A computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the invention is defined not by the detailed description of the invention but by the appended claims and their equivalents, and all differences within the scope will be construed as being included in the present invention.

What is claimed is:

1. A method of transmitting a Relay-Frame Control Header (R-FCH) in a Base Station (BS) of a Broadband Wireless Access (BWA) communication system, the method comprising:
    determining a modulation scheme of a Relay Station (RS) Downlink (DL)-MAP (R-MAP) in consideration of a channel state with the RS while at least one of an initial network entry process is performed by the RS and a communication with the RS is performed in a BS-RS area where communication is made with RSs connected to the BS; and
    transmitting a message including the determined modulation scheme to the RS,
    wherein, the transmitting of the message including the modulation scheme comprises transmitting the R-FCH, which is transmitted to the RS when communication starts in the BS-RS area, by combining at least one of the modulation scheme and an index mapped to the modulation scheme, and
    wherein the R-FCH combined with at least one of the modulation scheme and the index mapped to the modulation scheme comprises at least one element selected from a group consisting of sub-channel group information in the BS-RS area, repetition coding indication information on the R-MAP transmitted in the BS-RS area, modulation scheme information on the R-MAP, coding scheme information on the R-MAP, Downlink Interval Usage Code (DIUC) index information which is mapped to a combination of modulation and coding on the R-MAP, R-MAP length information indicating a length of the R-MAP, and start offset information of a BS-RS area in a next frame.

2. The method of claim 1, further comprising:
    allocating a Channel Quality Information CHannel (CQICH) to the RS; and
    monitoring the channel state with the RS by receiving a Signal to Noise Ratio (SNR) through the allocated CQICH from the RS.

3. The method of claim 1, wherein the message including the determined modulation scheme comprises at least one of a message that is exchanged in a last step of the initial network entry process and an R-DCD message to be transmitted to an RS that communicates with the BS in the BS-RS area.

4. The method of claim 1, further comprising, when the initial network entry process is started by the RS, transmitting to the RS a Downlink Channel Descriptor (DCD) message including Downlink Interval Usage Code (DIUC) index information which is mapped to a combination of modulation and coding.

5. The method of claim 3, wherein the transmitting of the message including the determined modulation scheme comprises transmitting of the message when the determined modulation scheme is different from a modulation scheme used in at least one of the initial network entry process and the communication with the RS.

6. A method of decoding a Relay Station (RS) Downlink (DL) MAP (R-MAP) in an RS of a Broadband Wireless Access (BWA) communication system, the method comprising:
    receiving from a Base Station (BS) a message including a modulation scheme of the R-MAP while at least one of an initial network entry process is performed by the BS and a communication with the BS is performed in a BS-RS area where communication is made with BSs connected to the RS; and decoding the R-MAP by using the modulation scheme, wherein the message comprises a Relay-Frame Control Header (R-FCH) received from the BS when communication starts in the BS-RS area and further wherein the message includes at least one of the modulation scheme and an index mapped to the modulation scheme, and wherein the R-FCH combined with at least one of the modulation scheme and the index mapped to the modulation scheme comprises at least one element selected from a group consisting of sub-channel group information in the BS-RS area, repetition coding indication information on the R-MAP transmitted in the BS-RS area, modulation scheme information on the R-MAP, coding scheme information on the R-MAP, Downlink Interval Usage Code (DIUC) index information which is mapped to a combination of modulation and coding on the R-MAP, R-MAP length information indicating a length of the R-MAP, and start offset information of a BS-RS area in a next frame.

7. The method of claim 6, wherein the message comprises at least one of a message that is exchanged in a last step of the initial network entry process and an R-DCD message to be received from the BS in the BS-RS area.

8. The method of claim 6, further comprising, when the initial network entry process is started by the RS, transmitting to the RS a Downlink Channel Descriptor (DCD) message including Downlink Interval Usage Code (DIUC) index information which is mapped to a combination of modulation and coding.

9. An apparatus for transmitting a Relay-Frame Control Header (R-FCH) in a Base Station (BS) of a Broadband Wireless Access (BWA) communication system, the apparatus comprising:

a controller for determining a modulation scheme of a Relay Station (RS) Downlink (DL)-MAP (R-MAP) in consideration of a channel state with the RS while at least one of an initial network entry process is performed by the RS and a communication with the RS is performed in a BS-RS area where communication is made with RSs connected to the BS; and a message generator for generating a message including the determined modulation scheme and for transmitting the generated message to the RS, wherein the message including the modulation scheme determined while performing the initial network entry process comprises the R-FCH transmitted to the RS when communication starts in the BS-RS area, and includes at least one of the modulation scheme and an index mapped to the modulation scheme, and wherein the R-FCH combined with at least one of the modulation scheme and the index mapped to the modulation scheme comprises at least one element selected from a group consisting of sub-channel group information in the BS-RS area, repetition coding indication information on the R-MAP transmitted in the BS-RS area, modulation scheme information on the R-MAP, coding scheme information on the R-MAP, Downlink Interval Usage Code (DIUC) index information which is mapped to a combination of modulation and coding on the R-MAP, R-MAP length information indicating a length of the R-MAP, and start offset information of a BS-RS area in a next frame.

10. The apparatus of claim 9, wherein the controller monitors a channel state with the RS by using a Signal to Noise Ratio (SNR) received from the RS through a Channel Quality Information CHannel (CQICH) allocated to the RS.

11. The apparatus of claim 9, wherein the message including the determined modulation scheme comprises at least one of a message that is exchanged in the last step of the initial network entry process and an R-DCD message to be transmitted to an RS that communicates with the BS in the BS-RS area.

12. The apparatus of claim 9, wherein, when the initial network entry process is started by the RS, the controller outputs, to the RS, Downlink Interval Usage Code (DIUC) index information mapped to a combination of modulation and coding, and wherein the message generator generates a Downlink Channel Descriptor (DCD) message including the DIUC index information and transmits the generated message to the RS.

13. The apparatus of claim 11, wherein the controller outputs the determined modulation scheme when the determined modulation scheme is different from a modulation scheme used in at least one of the initial network entry process and the communication with the RS.

14. An apparatus for decoding a Relay Station (RS) Downlink (DL)-MAP (R-MAP) in an RS of a Broadband Wireless Access (BWA) communication system, the apparatus comprising:

a message processor for receiving from a Base Station (BS) a message including a modulation scheme of the R-MAP while at least one of an initial network entry process is performed by the BS and a communication with the BS is performed in a BS-RS area where communication is made with BSs connected to the RS and for extracting from the message a modulation scheme of the R-MAP; and a controller for decoding the R-MAP by using the extracted modulation scheme, wherein the message comprises a Relay-Frame Control Header (R-FCH) received from the BS when communication starts in the BS-RS area, wherein the message includes at least one of the modulation scheme and an index mapped to the modulation scheme, and wherein the R-FCH combined with at least one of the modulation scheme and the index mapped to the modulation scheme comprises at least one element selected from a group consisting of sub-channel group information in the BS-RS area, repetition coding indication information on the R-MAP transmitted in the BS-RS area, modulation scheme information on the R-MAP, coding scheme information on the R-MAP, Downlink Interval Usage Code (DIUC) index information which is mapped to a combination of modulation and coding on the R-MAP, R-MAP length information indicating a length of the R-MAP, and start offset information of a BS-RS area in a next frame.

15. The apparatus of claim 14, wherein, when the initial network entry process is started by the BS, the message processor extracts Downlink Interval Usage Code (DIUC) index information from a Downlink Channel Descriptor (DCD) message received from the BS, and wherein the controller analyzes the R-FCH by using the extracted DIUC index information.

16. The apparatus of claim 14, wherein the message comprises at least one of a message that is exchanged in a last step of the initial network entry process and an R-DCD message to be received from the BS in the BS-RS area.

* * * * *